United States Patent
Enders (10) Patent No.: US 12,219,904 B2
(45) Date of Patent: *Feb. 11, 2025

(54) INFLATABLE MONOTUB SYSTEM AND METHOD

(71) Applicant: Boomer Shroomer, LLC, St. Louis, MO (US)

(72) Inventor: Ashley Enders, St. Louis, MO (US)

(73) Assignee: Boomer Shroomer, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/501,146

(22) Filed: Nov. 3, 2023

(65) Prior Publication Data

US 2024/0057530 A1 Feb. 22, 2024

Related U.S. Application Data

(63) Continuation of application No. 17/685,505, filed on Mar. 3, 2022, now Pat. No. 11,871,706.

(60) Provisional application No. 63/248,890, filed on Sep. 27, 2021.

(51) Int. Cl.
*A01G 18/64* (2018.01)

(52) U.S. Cl.
CPC .................. *A01G 18/64* (2018.02)

(58) Field of Classification Search
CPC ...................................... A01G 18/64
USPC ........................................... 47/1.1
See application file for complete search history.

(56) References Cited

U.S. PATENT DOCUMENTS

| | | | | |
|---|---|---|---|---|
| 4,809,352 A | * | 2/1989 | Walker | A45C 7/0081 383/3 |
| D333,592 S | * | 3/1993 | Walker | D7/605 |
| 9,854,886 B1 | * | 1/2018 | Xia | A45C 13/103 |
| 10,219,454 B2 | * | 3/2019 | Hall | A01G 2/20 |
| 10,799,002 B2 | * | 10/2020 | Bradley | A45C 7/0081 |
| 11,480,380 B2 | * | 10/2022 | Little | F25D 3/08 |
| 2007/0023439 A1 | * | 2/2007 | Vaughn | F25D 3/08 220/592.2 |
| 2014/0208642 A1 | * | 7/2014 | Henman | A01G 9/00 47/19.2 |
| 2017/0119116 A1 | * | 5/2017 | Bradley | A45C 13/36 |
| 2019/0045731 A1 | * | 2/2019 | Dixon | A01G 31/02 |
| 2019/0269246 A1 | * | 9/2019 | Youngblood | E04H 4/00 |

* cited by examiner

*Primary Examiner* — Monica L Perry
*Assistant Examiner* — Aaron M Rodziwicz
(74) *Attorney, Agent, or Firm* — Mary D. Lawlor; The Small Patent Law Group, LLC (57) ABSTRACT

An inflatable monotub system includes a body having plural surfaces defining an interior cavity. One or more of the plural surfaces includes a pocket disposed within the one or more of the plural surfaces. The plural surfaces define plural side surfaces and a bottom surface of the body. The body includes a first passage extending into at least a portion of one of the plural surfaces and fluidly coupled with one or more of the pockets of the plural surfaces. A first fluid is directed into or out of the first passage. Directing the first fluid into the first passage inflates at least one of the one or more pockets within the first fluid, and directing the first fluid out of the first passage deflates the at least one of the one or more pockets.

20 Claims, 7 Drawing Sheets

INFLATABLE MONOTUB SYSTEM AND METHOD

CROSS-REFERENCE TO RELATED APPLICATIONS

This application is a continuation of U.S. patent application Ser. No. 17/685,505, filed 3 Mar. 2022, which claims priority to U.S. Provisional Application No. 63/248,890, filed 27 Sep. 2021. The entire disclosures of each is incorporated herein by reference.

BACKGROUND

Technical Field

The subject matter described herein generally relates to an inflatable and deflatable monotub system and related methods.

Discussion of Art

A monotub or other containers may be used to grow mycological products such as mushrooms, yeast, or other fungal products. A monotub includes plural sides that form a cavity therein, and plural different agricultural and/or natural materials may be placed within the cavity to promote the growth of the mycological products. The monotub may also include one or more different vent holes that may be used to exhaust moisture or gases generated during the growth of the mycological products. Monotubs, or other containers used to grow mushrooms or other mycological products, may be sized to hold or contain about 15 gallons, 30 gallons, etc. Storing a 15 gallon or 30 gallon monotub, however, may be difficult.

Therefore, a need exists for a monotub that may change shapes and/or sizes between when the monotub is in use, and when the monotub is not being used and is being stored.

BRIEF DESCRIPTION

In one or more embodiments, a monotub system includes a body having plural surfaces defining an interior cavity. One or more of the plural surfaces may include a pocket disposed within the one or more of the plural surfaces. The plural surfaces may define plural side surfaces and a bottom surface of the body. The body may include a first passage extending into at least a portion of one of the plural surfaces and fluidly coupled with one or more of the pockets of the plural surfaces. A first fluid is directed into or out of the first passage. Directing the first fluid into the first passage inflates at least one of the one or more pockets within the first fluid, and directing the first fluid out of the first passage deflates the at least one of the one or more pockets.

In one or more embodiments, an inflatable monotub system includes a body manufactured of a flexible material. The body includes plural side surfaces and a bottom surface defining an interior cavity. Each of the plural side surfaces and the bottom surface comprising one or more pockets disposed within the plural side surfaces and the bottom surface. The body includes a first passage extending into at least a portion of one of the plural side surfaces. The first passage is fluidly coupled with at least one of the one or more pockets. A first fluid is directed into or out of the first passage. The body includes a second passage extending through the bottom surface and is fluidly coupled with the cavity. A second fluid mixture is directed out of the cavity via the second passage. Directing the first fluid into the first passage inflates at least one of the one or more pockets with the first fluid to change a shape and size of the body to a first shape and first size, and directing the first fluid out of the first passage deflates the at least one of the one or more pockets to change the shape and size of the body to a second shape and a second size.

In one or more embodiments, a method includes directing a first fluid into one or more pockets of a body of a monotub system via a first passage fluidly coupled with the one or more pockets. The one or more pockets are disposed within one or more of plural surfaces of the body. The one or more plural surfaces define a cavity of the monotub system. Directing the first fluid into the passage inflates the one or more pockets with the first fluid and changes a state of the body to an inflated state. A determination is made whether the state of the body needs to change. At least a portion of the first fluid is directed out of the one or more pockets via the first passage responsive to determining that the state of the body needs to change. Directing the at least the portion of the first fluid out of the one or more pockets deflates the one or more pockets and changes the state of the body to a deflated state.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a monotub system and method of changing a state of the monotub system between a deflated state and an inflated state. The monotub system may include a body that has plural surfaces, walls, sides, or the like. The plural surfaces may define a cavity therein. In one or more embodiments, the monotub system may include a cover that is removably coupled with the body of the monotub system to enclose a top, open portion of the cavity. The body of the monotub system may be manufactured of a flexible material such that a shape and size of the body may change. The monotub may include plural different passages that direct different fluids and fluid mixtures into and/or out of the cavity. A first passage may direct a first fluid (e.g., a gas or liquid) into and/or out of pockets defined by interior and exterior surfaces of the plural surfaces or sides of the body. For example, directing the first fluid into the pockets expands the pockets to inflate the body (e.g., increase the size and/or shape of the body). Additionally, directing the first fluid out of the pockets via the first passage deflates the pockets to deflate, contract, collapse, or the like, the body (e.g., to decrease the size and/or shape of the body).

The monotub system may be used to grow mycological products such as mushrooms or other fungi. For example, the monotub may be inflated to form the plural side surfaces and define the cavity. Plural different agricultural or natural materials may be placed within the cavity while the monotub system is in the inflated state to grow the mycological products. Growth of the products may generate or create moisture or a gas within the cavity. The monotub system may include passages that direct some of the moisture or gas out of the cavity. The monotube system may also include other passages that may be used to direct fluid and debris out of the cavity, such as after growth of the mycological products is completed and the cavity is being cleaned. In one or more embodiments, the state of the monotub system may be changed from the inflated state to the deflated state subsequent to completion of the growth of the mycological products and/or the cleaning of the cavity. For example, the first passage may be opened to direct the first fluid out of the pockets to deflate the pockets and deflate or collapse the body. For example, the body in the inflated state has a shape and size that is greater than a shape and size of the body in the deflated state.

While the terms "first," "second," "upper," "lower," and so on, are used herein to indicate portions of the monotub system, usage of the terms are merely with respect to the orientations shown in the drawings. Additionally, while various spatial and directional terms, such as top, bottom, lower, mid, lateral, horizontal, vertical, front, and the like, may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, or the like.

Figure 1:
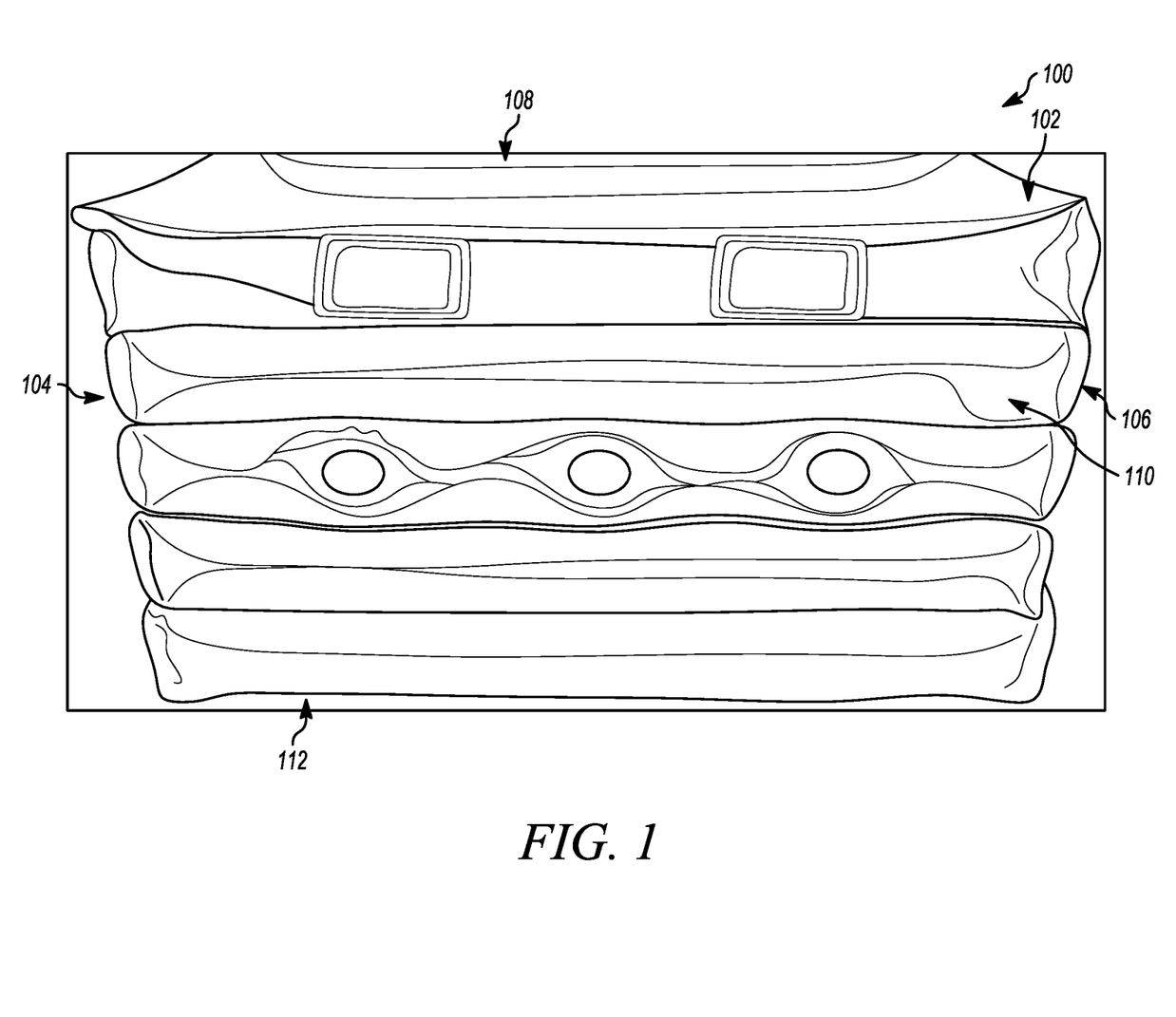
FIG. 1 illustrates a front perspective view of a monotub system in accordance with one embodiment.
Figure 2:
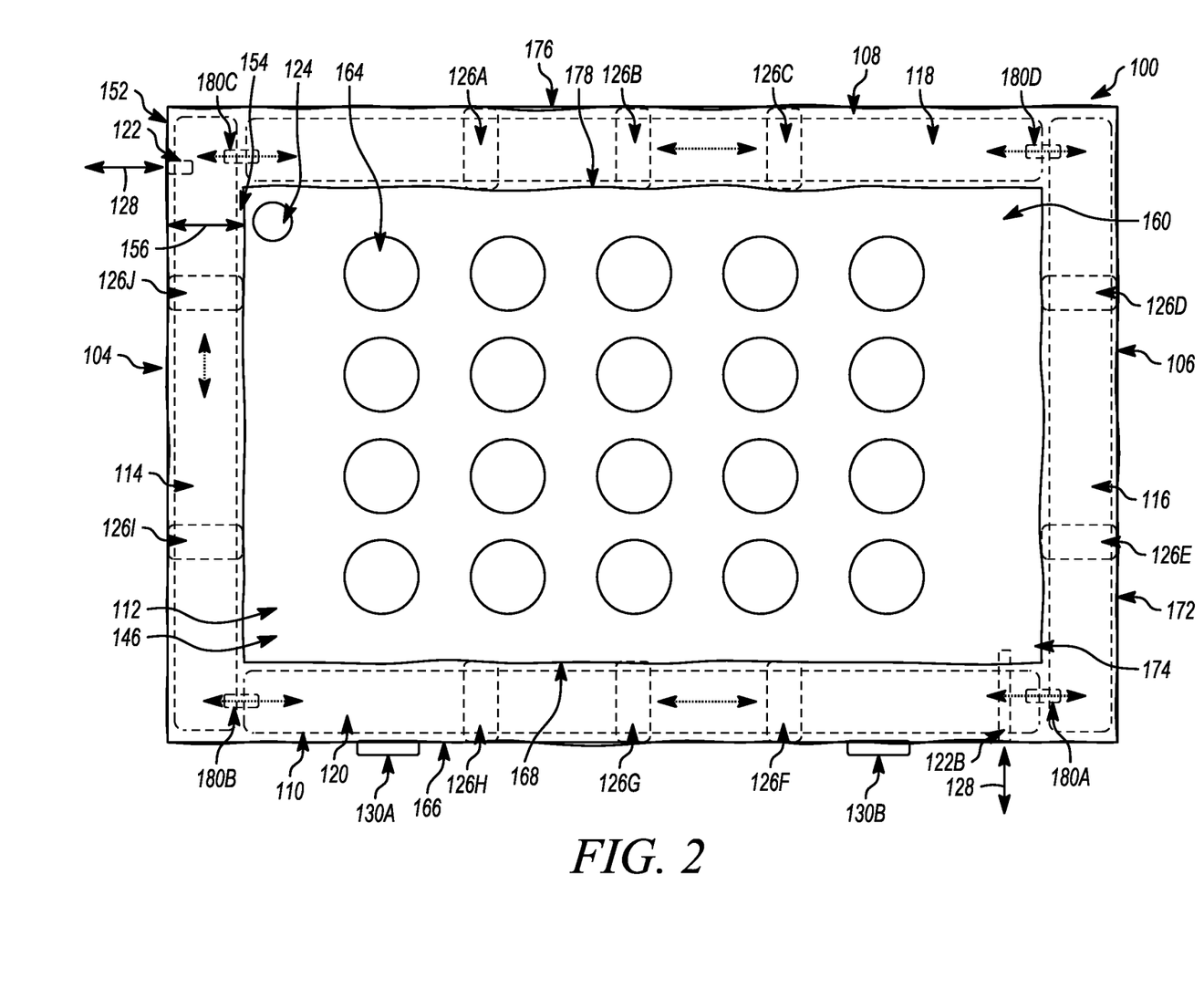
FIG. 2 illustrates a top view of the monotub system shown in FIG. 1 in accordance with one embodiment.
Figure 3:
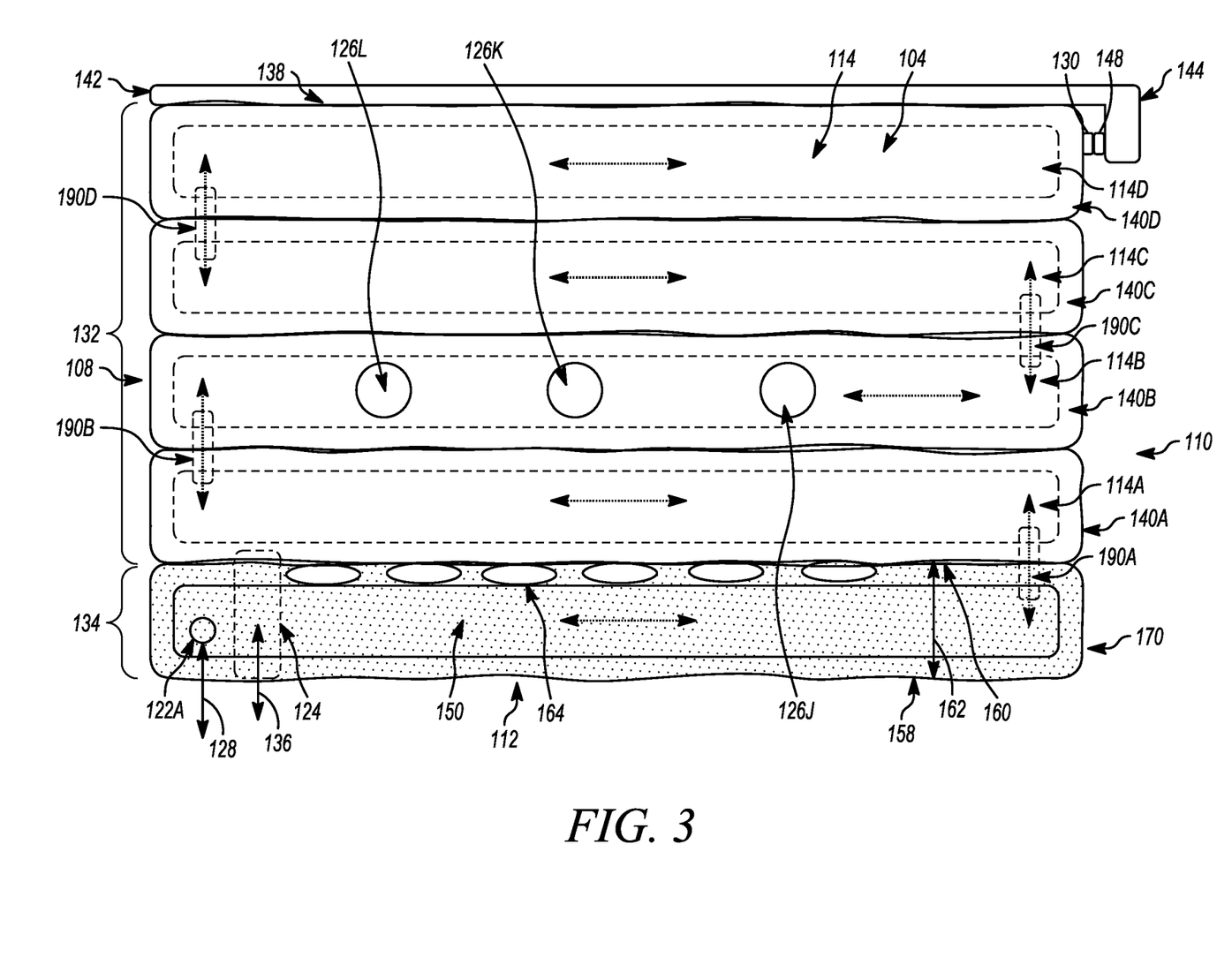
FIG. 3 illustrates a front view of the monotub system shown in FIG. 1 in accordance with one embodiment.

FIG. 1 illustrates a front perspective view of a monotub system 100 in accordance with one embodiment. FIG. 2 illustrates a top view of the monotub system shown in FIG. 1. FIG. 3 illustrates a front view of the monotub system. FIGS. 1, 2, and 3 will be discussed together herein.

The monotub system includes a body 102 having plural surfaces. The plural surfaces include plural side surfaces, such as a first side surface 104, a second side surface 106, a third side surface 108, and a fourth side surface 110. The body also includes a bottom surface 112. The plural surfaces define an interior cavity 146 of the body. In the illustrated embodiment, the body has a substantially rectangular cross-sectional shape, but alternatively may have an alternative shape and/or size. In one or more embodiments, the size and/or volume of the cavity may be defined by distances between the surfaces. For example, the first surface may be separated from the opposite second surface by a distance of about 1 foot, 2 feet, 5 feet, or the like, and the third surface may be separated from the opposite fourth surface by a distance of about 0.5 feet, 1 foot, 5 feet, or the like. The cavity may have a depth that is about 0.5 feet, 1 foot, 2 feet, 5 feet, or the like.

Each of the plural surfaces includes an interior surface and an exterior surface. Each interior surface faces toward the cavity, and is disposed between the corresponding exterior surface and the cavity. The first side surface includes an interior surface 154 and an exterior surface 152, the second side surface includes an interior surface 174 and an exterior surface 172, the third side surface includes an interior surface 178 and an exterior surface 176, the fourth side surface includes an interior surface 168 and an exterior surface 166, and the bottom surface includes an interior surface 160 and an exterior surface 158.

In one or more embodiments, the plural surfaces of the body may be manufactured of a flexible material. For example, the body may be manufactured with one or more materials that may temporarily change shape and/or size. The flexible material may be one or more various types of plastics, one or more various types of elastomers, glass fiber, or the like. Optionally, different portions of the body may be manufactured of different flexible and/or non-flexible materials. For example, the plural side surfaces may be manufactured of a first flexible material, and the bottom surface may be manufactured of a second flexible material. Optionally, the bottom surface may be manufactured of a non-flexible material, such as a hardened plastic material, or the like.

The interior and exterior surfaces of the plural side and bottom surfaces of the body define one or more pockets disposed within the plural surfaces of the body. For example, a first pocket 114 is defined by the interior and exterior surfaces of the first side surface, a second pocket 116 is defined by the interior and exterior surfaces of the second side surface, a third pocket 118 is defined by the interior and exterior surfaces of the third side surface, a fourth pocket 120 is defined by the interior and exterior surfaces of the fourth side surface, and a fifth pocket 150 is defined by the interior and exterior surfaces of the bottom surface of the body. For example, the cavity is separated from each of the pockets via each of the interior surfaces of the first, second, third, and fourth side surfaces and the interior surface of the bottom surface. Additionally, the cavity is fluidly separated from each of the plural pockets. The size of the pockets may be defined by a thickness of the interior surface and a thickness of the exterior thickness of the surface in which the pocket is disposed. One or more of the pockets may be fluidly coupled with each other via fluid coupling passages 180A-D.

The body includes a first passage 122 at the first side surface. Optionally, the first passage may be disposed at another location of the body, such as the second, third, or fourth side surfaces. In one or more embodiments, the first passage includes a first opening disposed at the exterior surface of the first side surface and a second opening disposed within the pocket of the first side surface. For example, the first passage extends a distance that is shorter than a distance 156 between the interior and exterior surface of the first surface.

A first fluid 128 may be directed into and out of the first pocket of the first side surface via the first passage. The first fluid may be a gas, a liquid, or a gas-liquid mixture. The first fluid may be directed from the first pocket into the second, third, fourth, and fifth pockets of the second, third, and fourth side surfaces and bottom surface, respectively via the fluid coupling passages that fluidly coupled the pockets together. Directing the first fluid into the pockets via the first passage inflates the pockets based on the interior and exterior surfaces of the plural surfaces being manufactured of a flexible material. For example, the first fluid is configured to expand the pockets to increase a distance between the interior and exterior surfaces of each of the plural surfaces. In one or more embodiments, the system may include a plug, cap, or the like, (not shown) that is removably coupled with the first opening of the first passage at the exterior surface of the first side surface. For example, the plug or cap of the first passage may block or restrict movement of the first fluid out of the first passage. The plug or cap may be removed or separated from the first passage to allow the first fluid to move out of the pockets. Directing the first fluid out of the pockets deflates the one or more pockets of the body. For example, a portion of one or more of the plural surfaces of the body may collapse, contract, shrink, or the like, responsive to the first fluid being directed out of the first passage.

Figure 4:
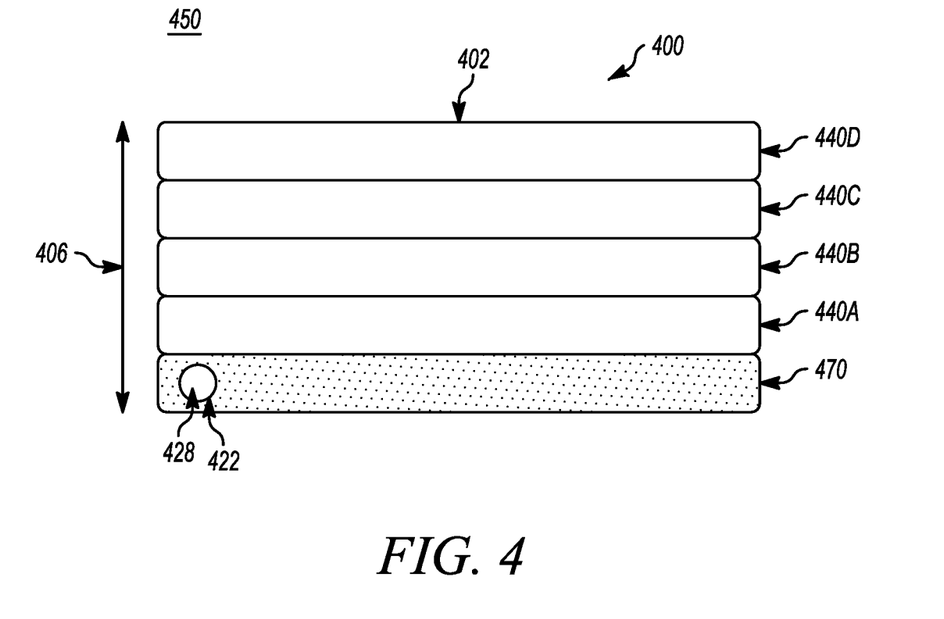
FIG. 4 illustrates one example of a monotub system in an inflated state in accordance with one embodiment.

The shape and size of the body may change responsive to a portion of the first fluid being directed into the pockets via the first passage, and a portion of the first fluid being directed out of the pockets via the first passage. For example, FIG. 4 illustrates one example of a body 402 of a monotub system 400 in an inflated state 450. The monotub system may be similar to the monotub system shown in FIGS. 1-3. For example, the monotub system includes the body having plural side surfaces that define a cavity, with plural pockets disposed within the plural side surfaces. The plural side surfaces are formed as layers 440A-D disposed within an upper portion of the body, and a bottom layer 470 disposed within a lower portion of the body.

The body includes a first passage 422 that has a first opening disposed at an exterior surface of one surface of the body. In the illustrated embodiment, the first passage is disposed within the bottom layer, but alternatively may be disposed within another layer of the body. Optionally, the first opening may be disposed at another region or location of the bottom layer (e.g., through a bottom surface of the bottom layer, another surface of the bottom layer, or the like). As illustrated in FIG. 4, a first fluid 428 is directed into the plural pockets (not shown) of the body via the first passage. Directing the first fluid into the plural pockets causes the flexible material of the surfaces of the body (e.g., the surfaces defining the plural pockets) to inflate, or increase in size. For example, a size of the body may change in a direction 406.

Figure 5:
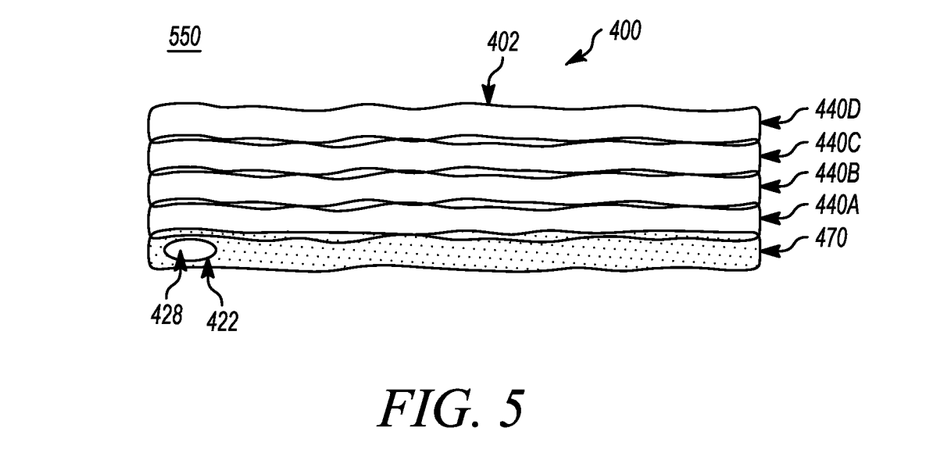
FIG. 5 illustrates one example of the monotub system shown in FIG. 4 in a deflated state in accordance with one embodiment.

Alternatively, FIG. 5 illustrates one example of the monotub system 400 in a deflated state 550. In the illustrated embodiment of FIG. 5, the first fluid is directed out of the plural pockets of the body via the first passage. Directing the first fluid out of the plural pockets causes the flexible material of the surfaces of the body (e.g., the surfaces defining the plural pockets) to deflate, or decrease in size in the direction 406. The monotub system in the inflated state illustrated in FIG. 4 has a first shape that is different than a second shape of the monotub system in the deflated state illustrated in FIG. 5. Additionally, the monotub system in the inflated state illustrated in FIG. 4 has a first size that is greater than a second size of the monotub system in the deflated state illustrated in FIG. 5. For example, directing the first fluid into the body to place the body in the inflated state increases the size of the body (e.g., relative to the deflated state), and directing the first fluid out of the body to place the body in the deflated state decreases the size of the body (e.g., relative to the inflated state).

In one or more embodiments, the first fluid may be directed into the first passage manually by an owner or user of the monotub system. For example, a user of the monotub system may blow air into the first passage to change the state of the body. Optionally, the first fluid may be directed into the first passage by a pump or pump system that may be operably coupled with the first passage. The cap or plug (not shown) may be coupled with the first opening of the first passage subsequent to the first fluid being directed into the body and the body reaching a target inflated shape and/or size. For example, the cap or plug may be coupled with the first passage to prohibit the first fluid from moving out of the body. Additionally, the cap or plug may be separated from the first passage (e.g., manually by the owner or user of the monotub system) to allow the first fluid to be directed out of the body.

Returning to FIGS. 1-3, in the illustrated embodiment, the body includes a single first passage that directs the first fluid into and out of the pockets. Optionally, the body may include two or more first passages disposed at different locations around the body. For example, one first passage may be fluidly coupled with the fifth pocket of the bottom surface, and another first passage may be fluidly coupled with the first, second, third, and fourth pockets of the first, second, third, and fourth side surfaces. Optionally, one first passage may direct a portion of the first fluid into a first portion of the first pocket of the first surface, and another first passage may direct another portion of the first fluid into a second portion of the first pocket that is fluidly separate from the first portion. Optionally, the first fluid may be directed into the one or more pockets via an alternative configuration.

The body may include a second passage 124 that is fluidly coupled with the cavity. In the illustrated embodiment, the second passage includes a first opening that is disposed at the exterior surface of the bottom surface and a second opening that is disposed at the interior surface of the bottom surface. For example, the second passage extends a distance 162 between the interior and exterior surfaces of the bottom surface. Optionally, the second passage may be positioned at another location or through another surface of the body. Optionally, the body may include two or more different second passages.

The second passage is fluidly coupled with the cavity. For example, the cavity may hold or contain a second fluid mixture, and a portion of the second fluid mixture may be directed out of the cavity via the second passage. The second fluid mixture may include a second fluid (e.g., a gas, a liquid, or a gas-liquid mixture) that is mixed or combined with debris (e.g., solid materials). In one or more embodiments, the system may include a plug, cap, or the like, (not shown) that is removably coupled with the first opening of the second passage at the exterior surface of the bottom surface. For example, the cap or plug may be coupled with the second passage to close the second passage and prohibit the second fluid mixture from being directed out of the cavity via the second passage. Additionally, the cap or plug may be removed or separated from the second passage to allow a portion or all of the second fluid mixture to be directed out of the cavity via the second passage. The cap or plug may be manually removed and/or coupled with the second passage by an owner or user of the monotub system.

In one or more embodiments, the plural side surfaces may be formed as layers. For example, as illustrated in FIG. 3, the plural side surfaces are separated, formed, or the like, into plural layers 140A-D. Each of the layers may extend around the perimeter of the body such that a portion of the first side surface, a portion of the second side surface, a portion of the third side surface, and a portion of the fourth side surface form a first layer 140A. Additionally, another portion of the first side surface, another portion of the second side surface, another portion of the third side surface, and another portion of the fourth side surface form a second layer 140B. Additionally, the bottom surface may be identified as a bottom layer 170. For example, the first layer is positioned between the bottom layer of the bottom surface and the second layer in a vertical direction. One or more of the layers 140A-D or 170 may have a common shape and/or size relative to another layer. For example, the bottom layer 170 may have a first shape and size (e.g., thickness), and the layers 140A-D may have a same or common second shape and size that is different than the first shape and size.

The pockets of each of the surfaces of the plural different layers may be fluidly coupled with each other via one or more additional fluid coupling passages 190A-D. For example, the first fluid may be directed into the first passage and into the fifth pocket of the bottom surface. A portion of the first fluid may be directed through a fluid coupling passage 190A into the pocket of the first layer 140A, some of the first fluid may be directed through a fluid coupling feature 190A from the pocket of the first layer toward the pocket of the second layer 140B, some of the first fluid may be directed through a fluid coupling feature 190C from the pocket of the second layer toward the pocket of the third layer 140C, and some of the first fluid may be directed through a fluid coupling feature 190D from the pocket of the third layer toward the pocket of the fourth layer 140D. Additionally, some of the first fluid may be directed through the fluid coupling passages 180A-D (shown in FIG. 2) that fluidly coupled the pockets of each of the plural side surfaces. Optionally, the pockets of the different layers and/or surfaces of the body may be fluidly coupled with each other or fluidly separate from each other via one or more other fluid coupling passage configurations.

The body may include plural third passages 126A-J that extend through one or more of the plural side surfaces. In the illustrated embodiment of FIG. 2, the body includes third passages 126A, B, and C that extend through the third side surface (e.g., between the exterior and interior surfaces of the third side surface), third passages 126D and 126E that extend through the second side surface (e.g., between the exterior and interior surfaces of the second side surface), third passages 126F, G, and H that extend through the fourth side surface (e.g., between the exterior and interior surfaces of the fourth side surface), and third passages 126I and 126J that extend through the first side surface (e.g., between the exterior and interior surfaces of the first side surface). Each of the third passages may fluidly couple the cavity with an area outside of the cavity. Optionally, the third passages may extend through any of the layers 140A-D of the body. For example, the third passages of the first and third surfaces may extend through the third layer 140C, and the third passages of the second and fourth surfaces may extend through the second layer 140B. Optionally, one or more of the third passages may be disposed to extend through any of the layers of the body in any pattern and/or random configuration.

In the illustrated embodiment, the body includes two third passages (126D and 126E) that extend through the second side surface and two third passages (126I and 126J) that extend through the first side surface. Additionally, the body includes three third passages (126A-C) that extend through the third side surface, and three third passages (126F-H) that extend through the fourth side surface. For example, the long surfaces (e.g., the second and fourth surfaces) have three third passages, and the short surfaces (e.g., the first and third surfaces) have two third passages. Optionally, the body may include any number of passages disposed at any location around the perimeter of the body.

In one or more embodiments, a portion of the second fluid mixture may be directed out of the cavity via one or more of the third passages. For example, the system may include caps or plugs that may be operably coupled with each of the third passages. One or more of the plugs or caps may be removed from one or more of the third passages to allow a portion of the second fluid mixture to be directed out of the cavity. For example, a first portion of the second fluid (e.g., gas, liquid, or the like) of the second fluid mixture may be directed out of the cavity via the third passages, and a second portion of the second fluid and the debris of the second fluid mixture may be directed out of the cavity via the second passage. In one or more embodiments, a portion of the second fluid mixture may be prohibited from being directed out of the cavity via the third passages by the caps or plugs. As one example, the caps or plugs may be manufactured of a solid material (e.g., plastic, glass, an engineered material, non-porous material, or the like) and may prohibit the portion of the second fluid mixture from escaping or being directed out of the cavity. As another example, the caps or plugs may be manufactured of a porous material (e.g., foam, sponge material, or the like) and may control an amount of the portion of the second fluid mixture that is allowed to be directed out of the cavity. In one or more embodiments, a non-porous plug may be coupled with one or more of the third passages, a porous-plug may be coupled with one or more other third passages, one or more other third passages may be void any plug or cover, or any combination therein.

In one or more embodiments, the body may include or may be defined as having an upper portion 132 and a lower portion 134. The layers 140A-D may be included in the upper portion, and the layer 170 may be included in the lower portion. Additionally, the plural side surfaces are positioned and extend within the upper portion, and the bottom surface is positioned and extends within the lower portion. In one or more embodiments, the upper and lower portions may be formed as a unitary, single structure or embodiment. For example, the upper and lower portions may be stamped, cured, or otherwise formed via known manufacturing methods as a unitary embodiment. Optionally, the upper portion may be formed as a first structure, and the lower portion may be independently formed as a second structure that may be operably coupled with the upper portion, such as via a secondary manufacturing process. The upper and lower portions may be formed of the same or a common flexible material, or may be formed of different flexible materials having different chemical characteristics.

In one or more embodiments, the upper portion may be manufactured of a transparent material, and the lower portion may be manufactured of an opaque material. For example, an owner or user of the monotub system may be able to see through (e.g., with the naked eye, without visual assistance such as a microscope, or the like) the layers of the upper portion. Additionally, the owner or user of the monotub system may be unable to see through the bottom layer of the lower portion.

In one or more embodiments, the interior surface of one or more of the plural side surfaces of the body may include one or more textured features. In the illustrated embodiment, the interior surface of the bottom surface includes plural texture features 164 that are arranged in columns and rows. Optionally, the bottom surface may include any number of textured features that may be positioned in any random and/or patterned configuration. One or more of the textured features may be bumps that are concave in shape and extend away from the interior surface of the bottom surface. For example, the concave bumps may be coupled with the interior surface such that the interior surface at the bumps extends or expands further into the cavity than another portion of the interior surface. Optionally, one or more of the textured features may be recesses or divots that are convex in shape and extend into the interior surface (e.g., toward the exterior surface) of the bottom surface.

The monotub system may include a cover 138 that is positioned on top sides of the first, second, third, and fourth side surfaces that are opposite the bottom surface. For example, the cover extends over a top, open portion of the cavity in order to enclose or cover at least a portion of the top of the cavity. In the illustrated embodiment, the cover includes a coupled end portion 142 that is coupled with the third surface of the body, and a free end portion 144 that is removably coupled with one or more of the first, second, or fourth side surfaces of the body. As one example, the cover may be formed as a unitary embodiment or structure with the body such that the coupled end of the cover and the third surface are formed as a unitary structure. As another example, the cover may be formed as a separate structure than the body, and the coupled end may be coupled with the third surface (or any alternative surface) by one or more coupling or fastening methods during a secondary manufacturing process, such as, but not limited to, a thermal process, fastener devices, adhesives, or the like. In one or more embodiments, the cover may be manufactured of a flexible material that is the same or similar to the flexible material of the body. Alternatively, the cover may be manufactured of a non-flexible material. Optionally, the cover may be transparent or opaque.

The free end of the cover may be removably coupled with the fourth side surface of the body. For example, the free end may include one or more fastening structures 148 such as Velcro, adhesive, or the like. The fastening structures may correspond with one or more body fastening structures 130 operably coupled with the exterior surface of the fourth side surface of the body. Optionally, the cover and the one or more surfaces of the body may be coupled by any alternative coupling structures such as zippers, male and female mating components, or the like. For example, a zipper may extend around at least a portion of the perimeter of the body, and a mating zipper may extend around the corresponding portion of the perimeter of the cover. The zipper of the body and the mating zipper of the cover may be coupled and decoupled with each other. In one or more embodiments, the cover may be devoid the coupled end, and may be fully or completely separable from the body of the monotub system. Optionally, the cover may include one or more passages, openings, or the like, to fluidly couple the cavity with an exterior of the cover.

Figure 6:
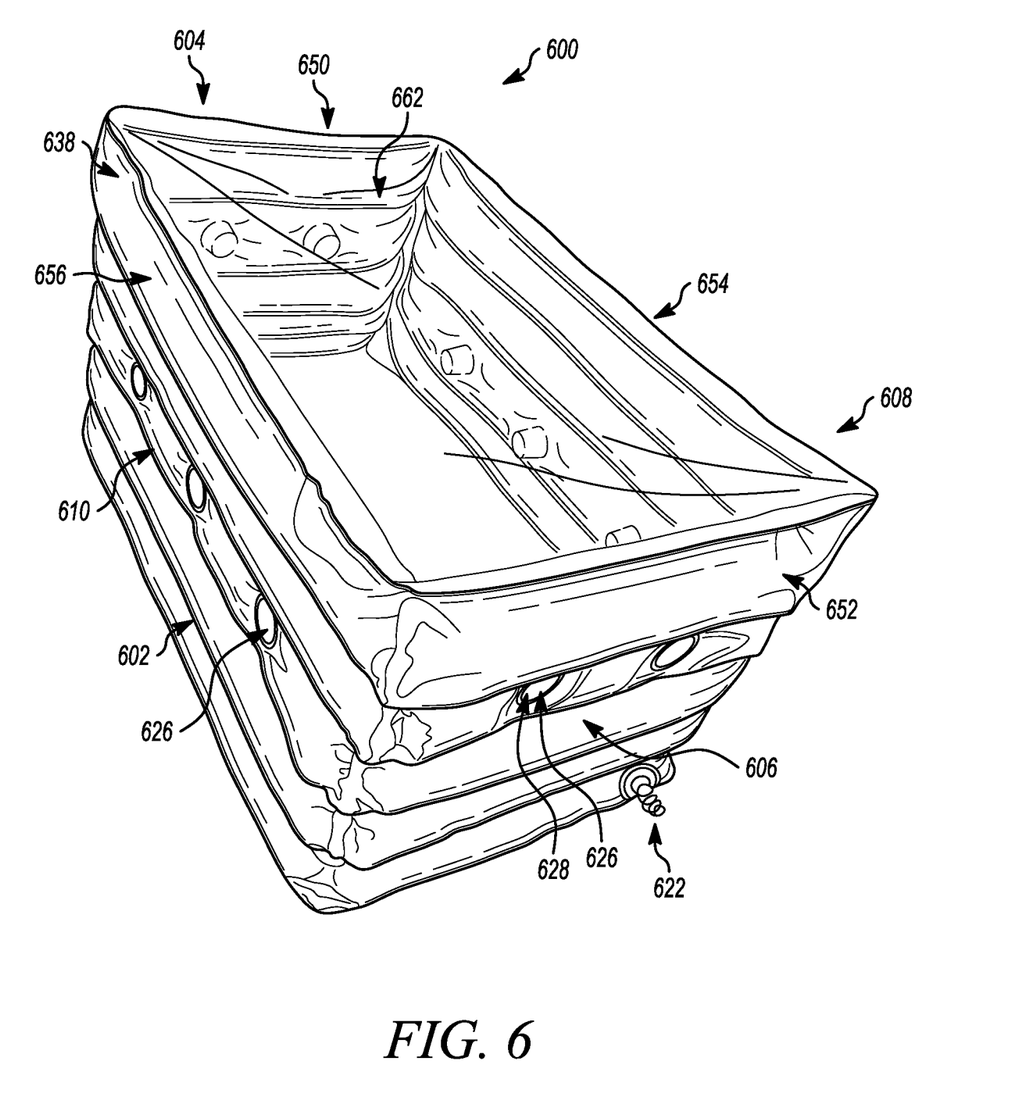
FIG. 6 illustrates a perspective view of a monotub system in accordance with one embodiment.

FIG. 6 illustrates a perspective view of a monotub system 600 in accordance with one embodiment. Like the monotub system shown in FIGS. 1 through 3, the monotub system includes a body 602 having first, second, third, and fourth side surfaces 604, 606, 608, 610, respectively. The plural side surfaces define an interior cavity of the body. Like the body 102 of the monotub system 100, each of the plural side surfaces include an interior surface and an exterior surface. The interior surface of each of the plural side surfaces faces toward the cavity, and the exterior surface of each of the plural side surfaces faces away from the cavity. The interior and exterior surfaces of each of the plural side surfaces define one or more pockets disposed within the plural side surfaces of the body.

The body also includes a first passage 622 that includes a first opening disposed at an exterior surface of the second side surface 606. A first fluid may be directed into and out of the pockets defined by the interior and exterior surfaces of each of the plural side surfaces. Directing the first fluid into the first passage changes the state of the body to an inflated state, and directing the first fluid out of the first passage changes the state of the body to a deflated state. In the illustrated embodiment, the first passage includes a plug, cap, or the like, that is removably coupled with the opening of the first passage at the exterior surface of the second side surface. The plug or cap may be placed within the opening of the first passage to restrict movement of the first fluid out of the first passage. Alternatively, the plug or cap may be removed from the opening of the passage to allow movement of the first fluid out of the first passage.

In the illustrated embodiment, the body includes plural third passages 626 that extend through one or more of the plural side surfaces. In the illustrated embodiment of FIG. 6, the body includes two third passages disposed at the first side surface 604, two third passages disposed at the second side surface 606, three third passages disposed at the third side surface 608, and three third passages disposed at the fourth side surface 610. Optionally, the body many include any number of third passages, and the third passages may be disposed in any patterned and/or random configuration about the perimeter of the body. In the illustrated embodiment, each of the third passages includes an opening, and a plug 628 is disposed within the opening of each of the third passages. One or more plugs may be disposed within one or more openings of the third passages to control one or more characteristics of fluids and/or solids disposed within the cavity of the body (not shown). In one embodiment, the plugs may be manufactured of a non-porous material, and may prohibit the fluids and/or solid matter from being directed out of the third passages. Optionally, one or more of the plugs may be manufactured of a porous material that may allow a portion of the fluids and/or solid matter to be directed out of the third passages. In one or more embodiments, a non-porous plug may be coupled with one or more of the third passages, and/or a porous-plug may be coupled with one or more other third passages, one or more other third passages may be void any plug or cover, or any combination therein.

The monotub system includes a cover 638 that is positioned on top sides of the first, second, third, and fourth side surfaces of the body. For example, the cover extends over a top, open portion of the cavity defined by the first, second, third, and fourth surfaces, and encloses or covers at least a portion of a top of the cavity. Unlike the cover shown in FIGS. 1 through 3, the cover 638 is detachable from the body. For example, the cover may be removably coupled with the body. In one embodiment, the cover may be shaped and sized to be coupled with the side surfaces of the body, such as with a press-fit. The cover is formed as a separate structure and may be positioned over the top portion of the cavity, and removed from the top portion of the cavity. In the illustrated embodiment, the cover is manufactured of the same or similar flexible material as the body of the monotub system. Alternatively, the cover may be manufactured of a flexible material that is different than the flexible material of the body, manufactured of a non-flexible material, or the like. Optionally, the cover may be transparent, opaque, or a combination therein.

Figure 7:
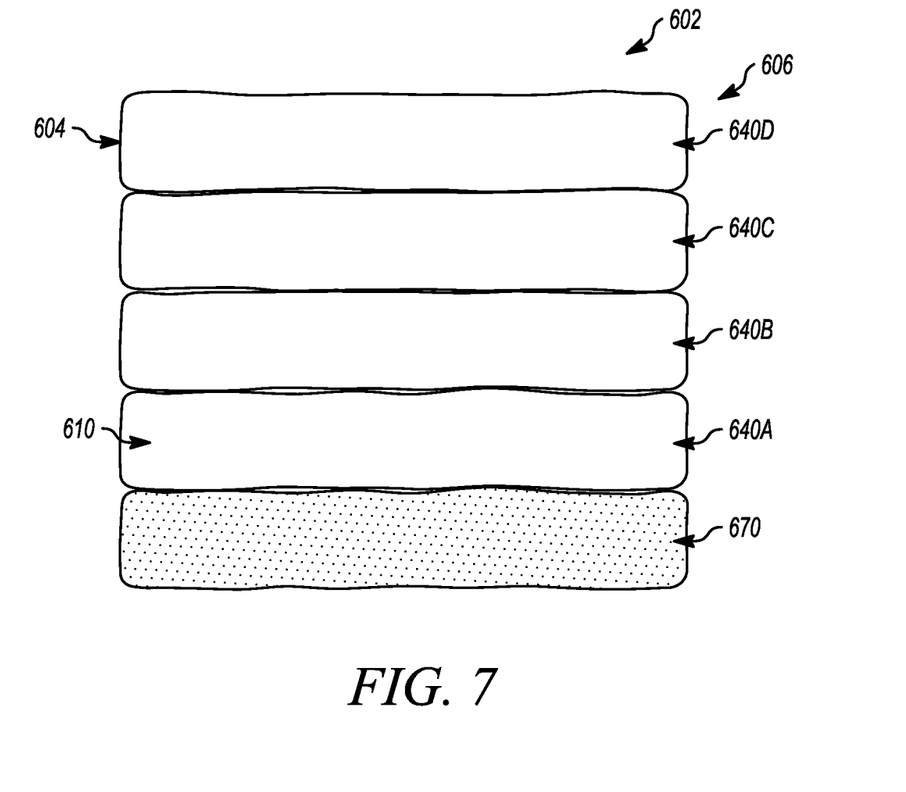
FIG. 7 illustrates a side view of a body of the monotub system shown in FIG. 6.
Figure 8:
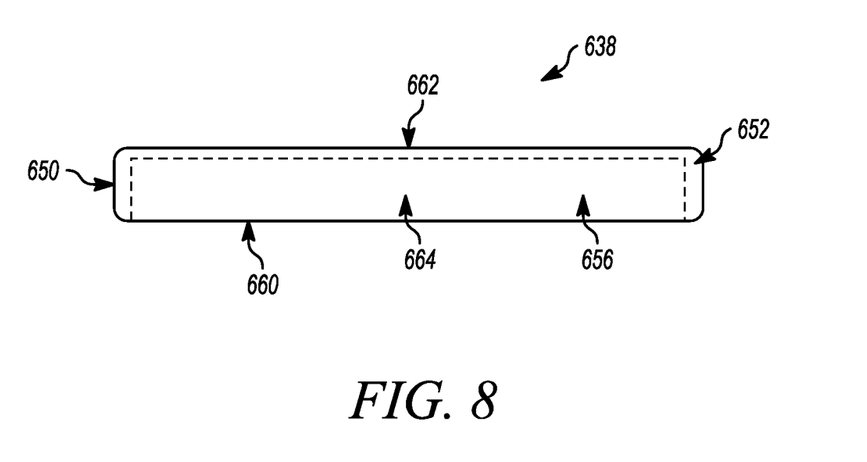
FIG. 8 illustrates a side view of a cover of the monotub system shown in FIG. 6.

FIG. 7 illustrates a side view of the body of the monotub system shown in FIG. 6, and FIG. 8 illustrates a side view of the cover of the monotub system shown in FIG. 6. The plural side surfaces of the body are formed as plural layers 640A-D that extend around the perimeter of the body. Additionally, the body includes a bottom layer 670, such that a first layer is positioned between the bottom layer and the second layer in a vertical direction. Each of the layers includes a portion of the pocket that extends between the interior and exterior surfaces of the side surfaces. For example, the first fluid may be directed into the first passage (shown in FIG. 6) that is disposed within the bottom layer, and may be directed into the pockets of the other layers that are fluidly coupled with the pocket of the bottom layer. In one or more embodiments, the body may include a second passage (not shown) that may allow or prohibit the second fluid mixture from being directed into and/or out of the cavity of the body. The second passage may be disposed at a location of the bottom layer, or at another location of the body.

The cover includes plural surfaces 650, 652, 654, 656 that extend around a perimeter of the cover. While the cover is coupled with the body, the surface 650 is coupled with or in contact with the first side surface 604, the surface 652 is coupled with or in contact with the second side surface 606, the surface 654 is coupled or it contact with the third side surface 608, and the surface 656 is coupled or in contact with the fourth side surface 610. The cover also includes a top surface 662 and an opposite bottom surface 660. A cover cavity 664 is defined by the top surface and the plural surfaces 650-656 of the cover. The cover has a size that is substantially the same as or larger than a size of the body of the monotub system. For example, the cover may be sized such that the plural surfaces 650-656 extend around the exterior surfaces of the plural side surfaces of the body. The cover may be coupled with or extend over the cavity of the body, and may be decoupled from the body by a user of the monotub system. While the cover is coupled with the body, the cover may be in a state of tension such that the cover may be fixed with or coupled to the body. For example, the cover may be prohibited from being removed from the body without a user removing the cover from the body. For example, the user may stretch, extend, or increase the size of the cover while the user is placing the cover onto the body to couple the cover with the body. Additionally, the user may stretch, extend, or increase the size of the cover while the user is removing the cover from the body.

Figure 9:
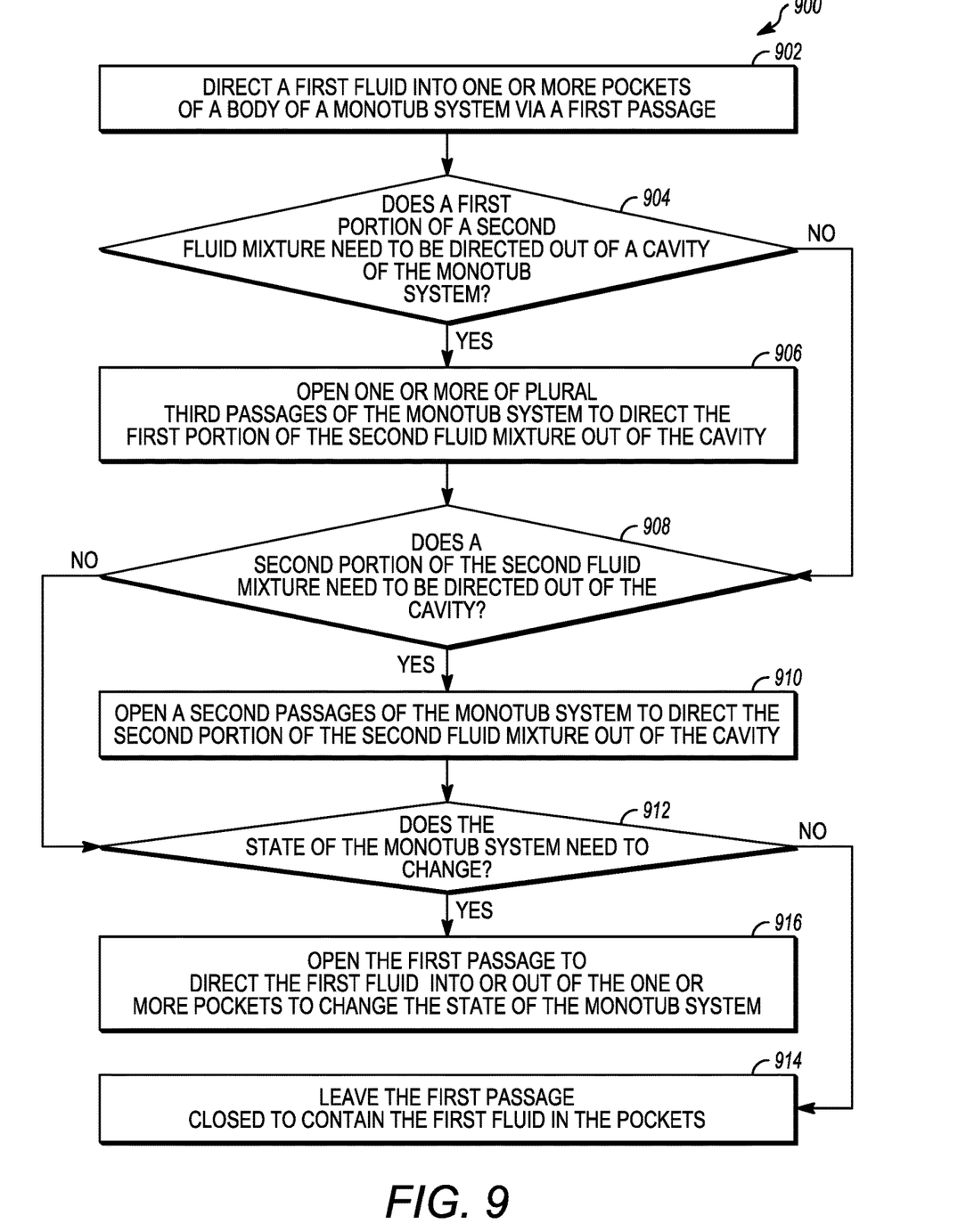
FIG. 9 illustrates a flowchart of one example of a method for changing a state of a monotub system in accordance with one embodiment.

FIG. 9 illustrates a flowchart 900 of one example of a method for changing a state of a monotub system in accordance with one embodiment. At step 902, a first fluid is directed into one or more pockets of a body of a monotub system (e.g., the monotub system 100, the monotub system 400, and/or the monotub system 600) via a first passage. The first fluid may be a gas, a liquid, or a gas-liquid mixture. The first fluid may be manually directed into the first passage, such as by an owner or user of the monotub blowing air into the first passage. Optionally, the first fluid may be directed into the first passage (manually or automatically) by a pump device. Directing the first fluid into the monotub system changes a state of the monotub system from a deflated state to an inflated state. For example, pockets within the monotub system that receive the first fluid may expand or increase in size responsive to the pockets receiving the first fluid. In one or more embodiments, a cap or plug may be coupled with the first passage subsequent to the first fluid being directed into the monotub system. For example, the cap or plug may prohibit the first fluid from being directed out of the first passage and out of the pockets.

In one or more embodiments, one or more agricultural and/or natural components or materials may be placed within a cavity of the body of the monotub system subsequent to the monotub system reaching the inflated state. The agricultural materials may be used to grow fungal, mushroom, or other mycological products. For example, the agricultural materials may include coconut coir, vermiculite, gypsum, water, or the like.

At 904, a decision is made whether a first portion of a second fluid mixture within the cavity of the monotub system needs to be directed out of the cavity. For example, the cavity may hold or contain the second fluid mixture that may include a second fluid (e.g., liquid, gas, or a liquid-gas mixture) and debris, such as debris from the agricultural materials. The second fluid may be generated by the growth of the mycological products. In one embodiment, a portion of the second fluid (e.g., moisture of the second fluid mixture) may need to be directed out of the cavity, such as to control a level of humidity within the cavity. If a portion of the second fluid mixture needs to be directed out of the cavity, flow of the method proceeds toward 906. Alternatively, if no portion of the second fluid mixture needs to be directed out of the cavity, flow of the method proceeds toward 908.

At 906, one or more of plural third passages are opened (e.g., plugs or caps of the corresponding third passages are removed or decoupled from the third passages) to direct or allow a first portion of the second fluid mixture out of the cavity. In one embodiment, the caps or plugs may be solid caps or plugs, and may be replaced by porous caps or plugs. The porous caps or plugs may control an amount of the first portion of the second fluid that is directed out of the cavity, may control a speed at which the first portion of the second fluid is directed out of the cavity, or the like. Optionally, the solid and/or porous caps or plugs may be removed or decoupled from the one or more third passages, and the third passages may remain open (e.g., other caps or plugs may not replace the solid and/or porous caps or plugs).

At 908, a decision is made whether a second portion of the second fluid mixture needs to be directed out of the cavity. As one example, the second portion of the second fluid mixture may need to be directed out of the cavity subsequent to completion of the grown of the fungal, mushrooms, or other mycological products. As another example, the fungi, mushrooms, or other mycological products may not have completed their growth and may not be ready to harvest. If the second portion of the second fluid mixture does not need to be directed out of the cavity, flow of the method proceeds toward 912. Alternatively, if the second portion of the second fluid mixture does need to be directed out of the cavity, flow of the method proceeds toward 910.

At 910, a second passage of the monotub system is opened to direct the second portion of the second fluid mixture out of the cavity. For example, the second passage may include a cap or plug coupled thereto that prohibits any portion of the second fluid mixture from being directed out of the cavity via the second passage. The cap or plug may be separated or decoupled from the second passage to allow the second portion of the second fluid mixture to be directed through the second passage. For example, the mycological products may have been harvested, and the debris remaining within the cavity includes growth debris mixed with a fluid. The fluid may be a gas generated by the growth of the mycological products, or a fluid directed into the cavity via a top open portion of the cavity, such as to clean or flush out the debris from the cavity.

At 912, a decision is made whether the state of the monotub system needs to change. As one example, the monotub system may be in an inflated state, growth of the mycological products may have been completed, and the state of the monotub may need to change to a deflated state (e.g., to store away the monotub while the monotub is not being used to grow the mycological products). As another example, the monotub system may be in the inflated state, but may need to inflate or increase in size to a larger inflated state. For example, the monotub system may have deflated while the monotub system is being used to grow the mycological products, and may need to be re-inflated to a larger inflated state.

If the state of the monotub system does not need to change, flow of the method proceeds toward 914, and the plug or cap of the first passage of the monotub system remains in place. For example, the plug or cap may prohibit the first fluid from being directed into or out of the pockets of the monotub. Alternatively, if the state of the monotub does need to change, flow of the method proceeds toward 916, and the plug or cap of the first passage is removed from the first passage to allow the first fluid to be directed into (to inflate) or out of (to deflate) the pockets to change the state of the monotub system. For example, the state of the monotub may change from the inflated state to the deflated state responsive to the completion of growth of the mycological products. The monotub system may be stored away while the monotub system is not in use in the deflated state, such as to reduce an amount of storage space needed to store the monotub system (e.g., relative to an increased amount of storage space need to store an inflated monotub system).

In one or more embodiments, a monotub system includes a body having plural surfaces defining an interior cavity. One or more of the plural surfaces may include a pocket disposed within the one or more of the plural surfaces. The plural surfaces may define plural side surfaces and a bottom surface of the body. The body may include a first passage extending into at least a portion of one of the plural surfaces and fluidly coupled with one or more of the pockets of the plural surfaces. A first fluid is directed into or out of the first passage. Directing the first fluid into the first passage inflates at least one of the one or more pockets within the first fluid, and directing the first fluid out of the first passage deflates the at least one of the one or more pockets.

Optionally, the monotub system may include a second passage extending through at least one of the plural surfaces and fluidly coupled with the cavity. A second fluid mixture may be directed out of the cavity via the second passage.

Optionally, the second fluid mixture may include a portion of a second fluid mixed with debris.

Optionally, the monotub system may include plural third passages extending through one or more of the plural side surfaces. The one or more third passage may direct a portion of the second fluid mixture out of the cavity.

Optionally, at least a portion of the plural surfaces of the body may collapse responsive to the first fluid being directed out of the first passage.

Optionally, the body may have a first shape responsive to the first fluid being directed into the first passage, and a different, second shape responsive to the first fluid being directed out of the first passage.

Optionally, the monotub system may include a cover having a coupled end portion and a free end portion. The coupled end portion may be coupled with at least one of the plural surfaces of the body, and the free end portion may include one or more fastener structures that may be coupled with one or more corresponding body fastener structures.

Optionally, the cover may extend over a portion of an opening of the cavity.

Optionally, the body may include an upper portion and a lower portion. The plural side surfaces may be positioned within the upper portion of the body, and the bottom surface of the body may be positioned within the lower portion of the body.

Optionally, the lower portion of the body may be opaque, and the upper portion of the body may be transparent.

Optionally, the lower portion and the upper portion may be formed as a unitary structure.

Optionally, the plural surfaces defining the plural side surfaces may be formed as layers. A first layer may be positioned between the bottom surfaces and a second layer.

Optionally, the pocket of one or more of the plural side surfaces of the first layer may be fluidly coupled with the pocket of one or more other side surfaces of the first layer.

Optionally, the body may be manufactured of a flexible material.

Optionally, directing the first fluid into the passage to inflate the at least one of the one or more pockets with the first fluid may increase a size of the body, and directing the first fluid out of the first passage to deflate the at least one of the one or more pockets may decrease the size of the body.

Optionally, the cavity may be fluidly separate from the one or more pockets.

In one or more embodiments, an inflatable monotub system includes a body manufactured of a flexible material. The body includes plural side surfaces and a bottom surface defining an interior cavity. Each of the plural side surfaces and the bottom surface comprising one or more pockets disposed within the plural side surfaces and the bottom surface. The body includes a first passage extending into at least a portion of one of the plural side surfaces. The first passage is fluidly coupled with at least one of the one or more pockets. A first fluid is directed into or out of the first passage. The body includes a second passage extending through the bottom surface and is fluidly coupled with the cavity. A second fluid mixture is directed out of the cavity via the second passage. Directing the first fluid into the first passage inflates at least one of the one or more pockets with the first fluid to change a shape and size of the body to a first shape and first size, and directing the first fluid out of the first passage deflates the at least one of the one or more pockets to change the shape and size of the body to a second shape and a second size.

Optionally, the inflatable monotub system may include plural third passages extending through one or more of the plural side surfaces. One or more of the plural third passages may direct a portion of the second fluid mixture out of the cavity.

Optionally, the inflatable monotub system may include a cover including a coupled end portion and a free end portion. The coupled end portion may be coupled with at least one of the plural surfaces of the body, and the free end portion may include one or more fastener structures that may be coupled with one or more corresponding body fastener structures. The cover may extend over a portion of an opening of the cavity.

In one or more embodiments, a method includes directing a first fluid into one or more pockets of a body of a monotub system via a first passage fluidly coupled with the one or more pockets. The one or more pockets are disposed within one or more of plural surfaces of the body. The one or more plural surfaces define a cavity of the monotub system. Directing the first fluid into the passage inflates the one or more pockets with the first fluid and changes a state of the body to an inflated state. A determination is made whether the state of the body needs to change. At least a portion of the first fluid is directed out of the one or more pockets via the first passage responsive to determining that the state of the body needs to change. Directing the at least the portion of the first fluid out of the one or more pockets deflates the one or more pockets and changes the state of the body to a deflated state.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A monotub system comprising:
   a flexible body comprising plural surfaces defining an interior cavity, one or more of the plural surfaces comprising a pocket disposed within the one or more of the plural surfaces, wherein the plural surfaces include plural side surfaces and a bottom surface of the body,
   the flexible body comprising a first passage extending into one of the plural surfaces, the first passage fluidly coupled with one or more of the pockets of the plural surfaces, wherein a first fluid is configured to be directed into or out of the first passage,
   wherein directing the first fluid into the first passage inflates one or more of the pockets with the first fluid, and directing the first fluid out of the first passage deflates one or more of the pockets, wherein the one or more pockets are configured to be inflated during a growing process of a product within the interior cavity of the flexible body, and
   wherein the flexible body comprises plural third passages extending through one or more of the plural side surfaces, one or more of the plural third passages configured to be open during the growing process of the product to allow gas generated during the growing process of the product to move out of the interior cavity and to allow air to move into the interior cavity during the growing process.

2. The monotub system of claim 1, further comprising a second passage extending through one of the plural surfaces and fluidly coupled with the cavity, a second fluid mixture is configured to be directed out of the cavity via the second passage.

3. The monotub system of claim 2, wherein the second fluid mixture includes a portion of a second fluid mixed with debris.

4. The monotub system of claim 2, wherein the second fluid mixture is configured to be directed out of the cavity via the plural third passages.

5. The monotub system of claim 1, wherein one or more of the plural surfaces of the flexible body are configured to collapse responsive to the first fluid being directed out of the first passage.

6. The monotub system of claim 1, wherein the flexible body is configured to have a first shape responsive to the first fluid being directed into the first passage, and the flexible body is configured to have a different, second shape responsive to the first fluid being directed out of the first passage.

7. The monotub system of claim 1, further comprising a flexible cover configured to be coupled with the flexible body, the flexible cover configured to extend over a portion of an opening of the cavity of the flexible body.

8. The monotub system of claim 1, wherein the flexible body includes an upper portion and a lower portion, wherein the plural side surfaces are positioned within the upper portion of the flexible body, and the bottom surface of the flexible body is disposed within the lower portion of the flexible body.

9. The monotub system of claim 8, wherein the lower portion of the flexible body is configured to be transparent or opaque, and the upper portion of the flexible body is configured to be transparent or opaque.

10. The monotub system of claim 8, wherein the lower portion and the upper portion are formed as a unitary structure.

11. The monotub system of claim 1, wherein the plural surfaces defining the plural side surfaces are formed as layers, wherein a first layer is positioned between the bottom surface and a second layer.

12. The monotub system of claim 11, wherein the pocket of one of the plural side surfaces of the first layer is fluidly coupled with the pocket of one or more other side surfaces of the first layer.

13. The monotub system of claim 1, wherein the flexible body is manufactured of a flexible material.

14. The monotub system of claim 1, wherein directing the first fluid into the first passage to inflate the one or more pockets with the first fluid increases a size of the flexible body, and directing the first fluid out of the first passage to deflate the one or more pockets decreases the size of the flexible body.

15. The monotub system of claim 1, wherein the cavity is fluidly separate from the one or more pockets.

16. An inflatable monotub system for use in growing mycological products, the inflatable monotub system comprising:
   a flexible body made of a flexible material, the flexible body comprising plural side surfaces and a bottom surface defining an interior cavity, each of the plural side surfaces and the bottom surface comprising one or more pockets disposed within the each of the plural side surfaces and the bottom surface,
   the flexible body comprising a first passage extending into one of the plural side surfaces, the first passage fluidly coupled with at least one of the one or more pockets, wherein a first fluid is configured to be directed into or out of the first passage,
   the flexible body comprising plural third passages extending through one or more of the plural side surfaces, the plural third passages configured to be open during a growing process of the mycological products to allow gas generated during the growing process of the mycological products to move out of the interior cavity, wherein directing the first fluid into the first passage inflates one or more of the pockets with the first fluid to change a shape and a size of the flexible body to a first shape and first size, and directing the first fluid out of the first passage deflates one or more of the pockets to change the shape and size of the flexible body to a second shape and second size.

17. The inflatable monotub system of claim 16, further comprising a second passage extending through the bottom surface and fluidly coupled with the interior cavity, wherein a second fluid mixture is configured to be directed out of the interior cavity via the second passage.

18. The inflatable monotub system of claim 16, further comprising a cover configured to be coupled with the flexible body, the cover configured to extend over a portion of an opening of the cavity of the flexible body.

19. The inflatable monotub system of claim 18, wherein the cover is configured to be detachably coupled with the flexible body.

20. A method comprising:
   directing a first fluid into one or more pockets of a flexible body of a monotub system via a first passage fluidly coupled with the one or more pockets, the one or more pockets disposed within one or more of plural surfaces of the flexible body, the one or more plural surfaces defining a cavity, wherein directing the first fluid into the first passage inflates the one or more pockets with the first fluid and changes a state of the flexible body to an inflated state, wherein the monotub system in the inflated state is configured for use to grow mycological products;
   directing gas generated during the growing process of the mycological products out of the interior cavity via plural third passages extending through one or more of the plural side surfaces, at least one of the plural third passages configured to be open during the growing process of the mycological products;
   determining that the state of the flexible body needs to change; and
   directing the first fluid out of the one or more pockets via the first passage responsive to determining that the state of the flexible body needs to change, wherein directing the first fluid out of the one or more pockets deflates the one or more pockets and changes the state of the flexible body to a deflated state.

* * * * *